United States Patent
Brush et al.

(10) Patent No.: US 7,830,359 B2
(45) Date of Patent: Nov. 9, 2010

(54) FOOT-BASED INTERFACE FOR INTERACTING WITH A COMPUTER

(75) Inventors: Alice Jane B. Brush, Bellevue, WA (US); Brian R. Meyers, Issaquah, WA (US); Marc A. Smith, Redmond, WA (US); Steven M. Drucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 11/350,189

(22) Filed: Feb. 8, 2006

(65) Prior Publication Data

US 2007/0182709 A1 Aug. 9, 2007

(51) Int. Cl.
G09G 5/00 (2006.01)

(52) U.S. Cl. .......................... 345/156; 463/36

(58) Field of Classification Search ................. 345/156, 345/168–179; 463/36–39
See application file for complete search history.

(56) References Cited

U.S. PATENT DOCUMENTS

| | | | | |
|---|---|---|---|---|
| 5,889,510 A * | 3/1999 | Klarlund | ..................... | 345/168 |
| 6,450,886 B1 * | 9/2002 | Oishi et al. | ................... | 463/36 |
| 6,697,841 B1 * | 2/2004 | Sheffield et al. | ............ | 709/206 |
| 6,798,396 B2 * | 9/2004 | Gemunder et al. | .......... | 345/156 |
| 6,801,188 B2 * | 10/2004 | Longobardi | ................. | 345/156 |
| 6,975,303 B2 * | 12/2005 | Dalsey | ....................... | 345/163 |
| 7,230,607 B2 * | 6/2007 | Ono | ........................... | 345/172 |
| 7,369,116 B2 * | 5/2008 | Logue | ......................... | 345/156 |
| 2001/0016510 A1 * | 8/2001 | Ishikawa et al. | ............... | 463/7 |
| 2002/0109668 A1 * | 8/2002 | Rosenberg et al. | ......... | 345/156 |
| 2002/0180695 A1 * | 12/2002 | Lawrence et al. | .......... | 345/156 |
| 2003/0090474 A1 * | 5/2003 | Schaefer | ..................... | 345/173 |
| 2003/0128186 A1 * | 7/2003 | Laker | ......................... | 345/156 |
| 2003/0132910 A1 * | 7/2003 | Garcia | ........................ | 345/156 |
| 2004/0044732 A1 * | 3/2004 | Fushiki et al. | .............. | 709/205 |
| 2004/0150535 A1 * | 8/2004 | Sun | ............................. | 341/22 |
| 2004/0260779 A1 * | 12/2004 | Sheffield et al. | ............ | 709/206 |
| 2007/0057921 A1 * | 3/2007 | Jenkins et al. | .............. | 345/172 |

\* cited by examiner

*Primary Examiner*—Alexander Eisen
*Assistant Examiner*—Nelson Lam

(57) ABSTRACT

Methods and systems for using a foot-based interface to interact with a computer are described. An application program from a plurality of application programs is executed on an operating system of a personal computer. The application program is configured to receive user input via a foot-based interface. Further, user input is received from the foot-based interface and mapped into a command. Moreover, the command controls an application program function. Also, the command is executed and an output corresponding to the execution of the command is generated. Additionally, the output is displayed to the user.

10 Claims, 8 Drawing Sheets

FOOT-BASED INTERFACE FOR INTERACTING WITH A COMPUTER

TECHNICAL FIELD

Embodiments of the present invention pertain to a foot-based interface for interacting with a computer.

BACKGROUND

As our society advances and its progression through the information age continues, our occupations became even less physical based. Consequently, for a significant number of people, work requires them to perform a growing amount of tasks on their computers.

And although working on a computer is often more productive and convenient, the side-effect is often remaining in one position for long periods of time, which frequently leads to a decrease in overall physical activity. Thus, as companies and organizations become more dependent on computers, it becomes increasingly more difficult for people to integrate a healthy amount of physical activity into their daily work routines.

Unfortunately, lack of exercise can cause a myriad of health problems. For example, lack of proper amounts of exercise can lead to weight gain, decrease in cardiovascular health, loss in bone density, and/or increase in anxiety and stress.

Furthermore, a high usage of computers does not only lead to lack of exercise but can be a health threat in itself as well. For example, continuous repetitive motions without breaks, such as typing, may lead to Repetitive Strain Injury (RSJ). Similarly, sitting in a fixed position for long periods without breaks can cause chronic back pain as well.

One way of overcoming the problems associated with increased computer usage is to take more breaks. However, taking breaks may lead to an overall decrease in efficiency. Furthermore, the idea of simply walking away from a computer for a few minutes may fail to motivate some individuals that desire a more fun and interactive break.

In addition to causing health problems, the traditional keyboard and mouse interface can be simply inconvenient in certain situations as well. In one instance, a mother with a baby in her arms is unable to easily perform simple tasks, such as checking email, on a computer. In another instance, interactive advertisement from businesses lack an effective interface that enables easy interaction with shoppers that carry bags in their hands.

SUMMARY

The method for using a foot-based interface to interact with a personal computer is disclosed. The method includes executing an application program from a plurality of application programs on an operating system of a personal computer. The application program is configured to receive user input via a foot-based interface. Furthermore, the method includes receiving user input from the foot-based interface and mapping the user input into a command. The command controls an application program function. Additionally, the method includes executing the command and generating an output corresponding to execution of the command. Moreover, the method includes displaying the output to the user.

DETAILED DESCRIPTION OF THE DRAWINGS

Figure 1:
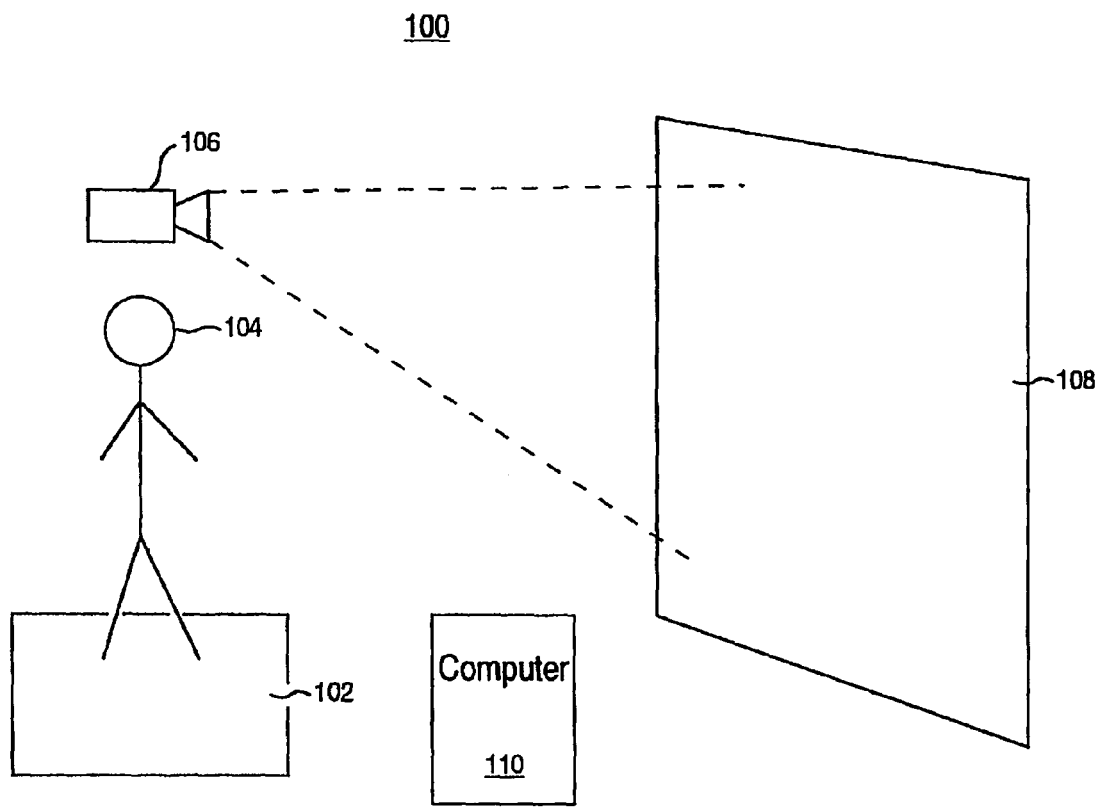
FIG. 1 illustrates a block diagram of a system for interacting with a computer via a foot-based interface, in accordance with an embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Because spending a significant amount of time working on a computer often leads to lack of physical activity and/or other health problems such as Repetitive Strain Injury (RSI), solutions to ameliorate issues associated with working for long hours on computers without compromising productivity is desired.

Conventionally, one solution is to simply take more breaks. However, taking breaks may lead to an overall decrease in efficiency. Furthermore, the idea of simply walking away from a computer for a few minutes may fail to motivate some individuals that prefer a more fun and interactive break.

In contrast to conventional approaches, embodiments set forth a method of utilizing a foot-based interface to interact with a personal computer. By utilizing a foot-based interface, a user can take a break from his or her usual work position, e.g., sitting down, and perform tasks standing up by using a foot-based interface that provides a certain amount of exercise. Advantageously, embodiments allow users to interact with a computer in a different method, which helps to prevent work related injuries such as Repetitive Strain Injury (RSI).

Moreover, embodiments can transform tedious tasks, such as reading through email messages or managing photos, into a more fun and enjoyable experience. For example, in a school environment, students may find using a foot-based interface to interact with a computer program more exciting and fun than using the traditional keyboard and mouse. For instance, while a student may find a class that requires seating in front of a computer screen to be boring, the same student may find the class much more fun if he or she can perform the same learning tasks while moving around, stepping on different parts of a foot-pad to generate commands, and at the same time learning just as much, if not more.

In one embodiment, the method includes executing an application program from a plurality of application program functions on an operating system of a personal computer, wherein the application program is configured to receive user input via a foot-based interface, such as a foot-pad with a plurality of step-on-sections or an optical based motion detection system. Further, the method includes receiving user input from the foot-based interface, and mapping the user input into a command, wherein the command controls an application program function (e.g., an email application). Additionally, the method includes executing the command and generating an output corresponding to execution of the command. Moreover, the method includes displaying the output to the user.

FIG. 1 illustrates a block diagram of a system 100 for interacting with a computer via a foot-based interface in accordance with an embodiment of the present invention. System 100 includes a projector 106 for projecting an image onto a display, a user 104, a footpad 102 for receiving user input, a computing device 110 for processing user input, and a display 108. In one embodiment, footpad 102 is communicatively coupled with computing device 110 and computing device 110 is communicatively coupled with projector 106.

Also, although system 100 is shown and described as having certain numbers and types of elements, the present invention is not so limited; that is, system 100 may include elements other than those shown, and may include more than one of the elements that are shown. For example, system 100 can include a greater or fewer number of displays than the one (display 108) shown.

In one embodiment, a user 104 utilizes system 100 to check email. Utilizing footpad 102, user 104 inputs commands to computing device 110 (e.g., a personal computer). User 104 may step on different portions of footpad 102 in a certain sequence as to input a series of commands, such as deleting or flagging an email, to be processed by computing device 110.

Also, Footpad 102 can be implemented in a variety of ways. The shape of footpad 102 can be rectangular, circular, ovular, continuous, and/or defined by separate pieces. In addition, footpad 102 may be divided into different fixed sections, wherein different fixed sections correspond to different commands and/or instructions. Moreover, footpad 102 can be flat, non-flat, and/or include elevated areas. Further, footpad 102 can function on a pressure-sensitive motion detection mechanism and/or function with an optical motion detection mechanism.

Upon receiving information from computing device 110 (e.g., a personal computer), projector 106 projects images onto display 108 to provide feedback to user 104. It is understood that user 104 can perform different tasks, such as email, photo management, and/or text editing with system 100.

In contrast to the traditional method of using a keyboard and mouse to interact with a computer, embodiments efficiently utilize a foot-based interface to interact with different application programs. Hence, embodiments allow a user to take a break from his or her normal sitting position and engage in a fun and interactive form of exercise.

Moreover, embodiments allow a user a way of interacting with a computer without having to sit down and use a keyboard and mouse. This can be helpful in different scenarios. In one example, an embodiment allows a mother holding a baby to check email using her feet alone. In another example, businesses can effectively apply the embodiments to a form of interactive advertisement with a foot-based interface. Thus, in one instance, a shopper carrying bags in his or her hands can still effectively interact with an interactive advertisement by using the foot-based interface.

Figure 2:
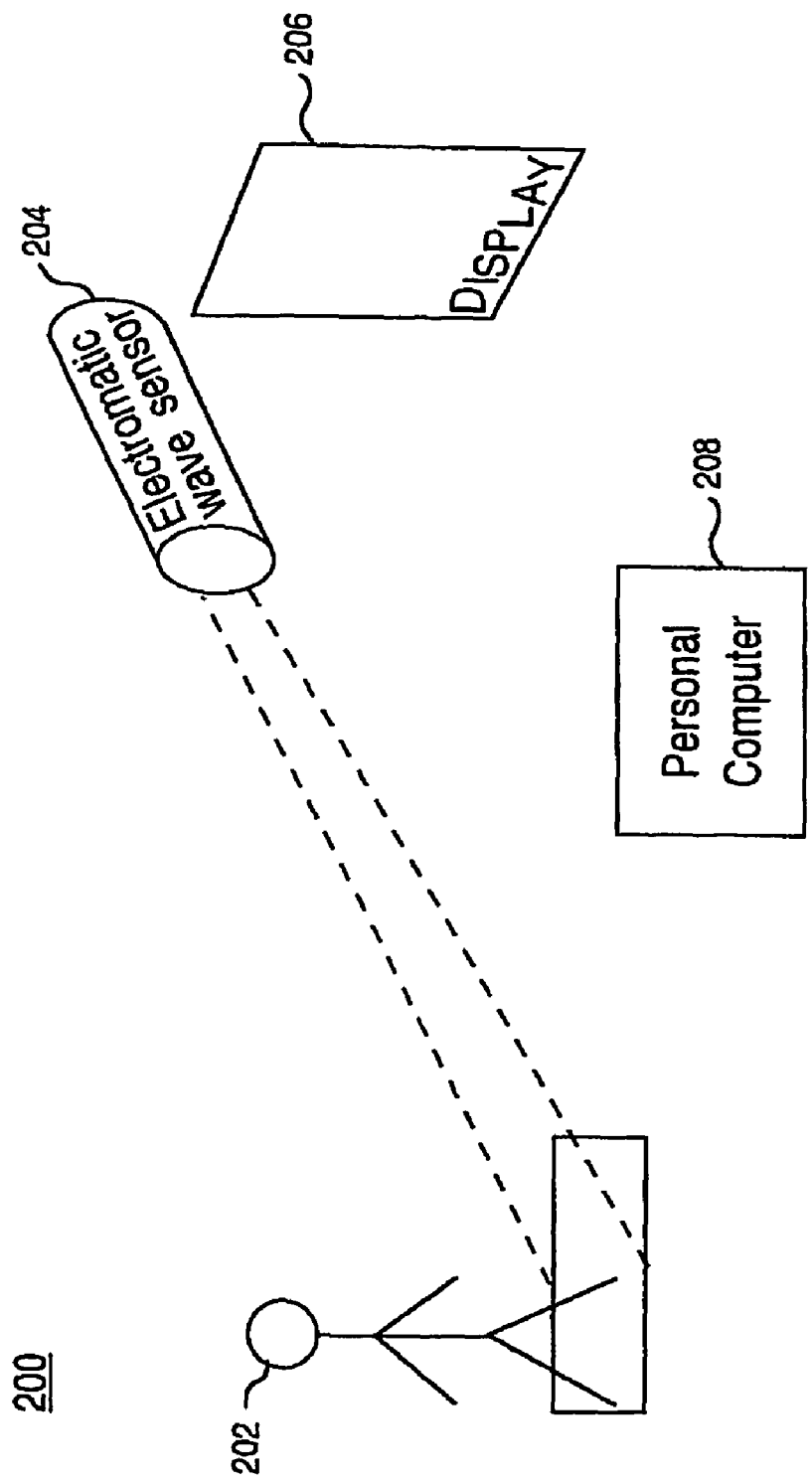
FIG. 2 illustrates a block diagram of a system for using a foot-based interface to interact with a personal computer, in accordance with an embodiment of the present invention.

FIG. 2 illustrates a block diagram of a system 200 for using a foot-based interface to interact with a personal computer, in accordance with an embodiment of the present invention. The system 200 includes a user 202, electromagnetic wave sensor 204, a personal computer 208, and a display 206. Electromagnetic wave sensor 204 is communicatively coupled with personal computer 208. Electromagnetic wave sensor 204 can be tuned to detect different wavelengths of the electromagnetic wave spectrum. For example, electromagnetic wave sensor 204 can be tuned to detect electromagnetic waves within the visible spectrum, the radio spectrum, the infrared spectrum, X-ray spectrum, ultraviolet spectrum, and gamma ray spectrum. Also, although one embodiment is described in the context of utilizing an electromagnetic wave sensor, embodiments are not so limited. Embodiments can be based thermal sensors, electrical resistance sensors, electrical current sensors, pressure sensors, mechanical sensors, accelerometer sensors, magnetometer sensors, orientation or gyroscopic sensors, wearable sensors (e.g., a sensor attached to a user's foot), and other types of sensors. In one exemplary implementation, a sensor (e.g., mechanical based pressure sensor) can be embedded underground to receive user input. In one example, an interactive advertisement from businesses can utilized mechanical sensors embedded underground to serve as an efficient and robust interface to interact with customers. Advantageously, a foot-based interface allows customers carrying objects in their hands an alternative way to interact with a computer. Furthermore, a sensor embedded underground is less likely to be damaged or stolen.

In addition, although system 200 is shown and described as having certain numbers and types of elements, the present invention is not so limited; that is, system 200 may include elements other than those shown, and may include more than one of the elements that ate shown. For example, system 200 can include a greater or fewer number of electromagnetic sensors than the one (electromagnetic sensor 204) shown.

In one embodiment, a user 202 utilizes system 200 for photos management. The movement of user 202 is monitored by electromagnetic wave sensor 204 and translated into one or more commands by personal computer 208. In one example, personal computer 208 is operating a photos application program having a plurality of photos application program functions on an operating system of the personal computer 204, wherein the photos application program is configured to receive user input via electromagnetic wave sensor 204. As user 202 moves his or her feet, user input is received via electromagnetic wave sensor 204. The personal computer 208 maps the user input into a command, wherein the command controls an application program function (e.g., zoom in on the selected photo function). The command is executed by personal computer 208 and an output corresponding to the execution of the command is generated. The output is displayed via display 206 to the user 202.

Unlike conventional methods, a user can manage photos by simply moving his or her feet. The electromagnetic wave sensor (e.g., a visual motion detection system) tracks the user's feet movement and translates it into a series of commands that control a photos management application program.

Figure 3:
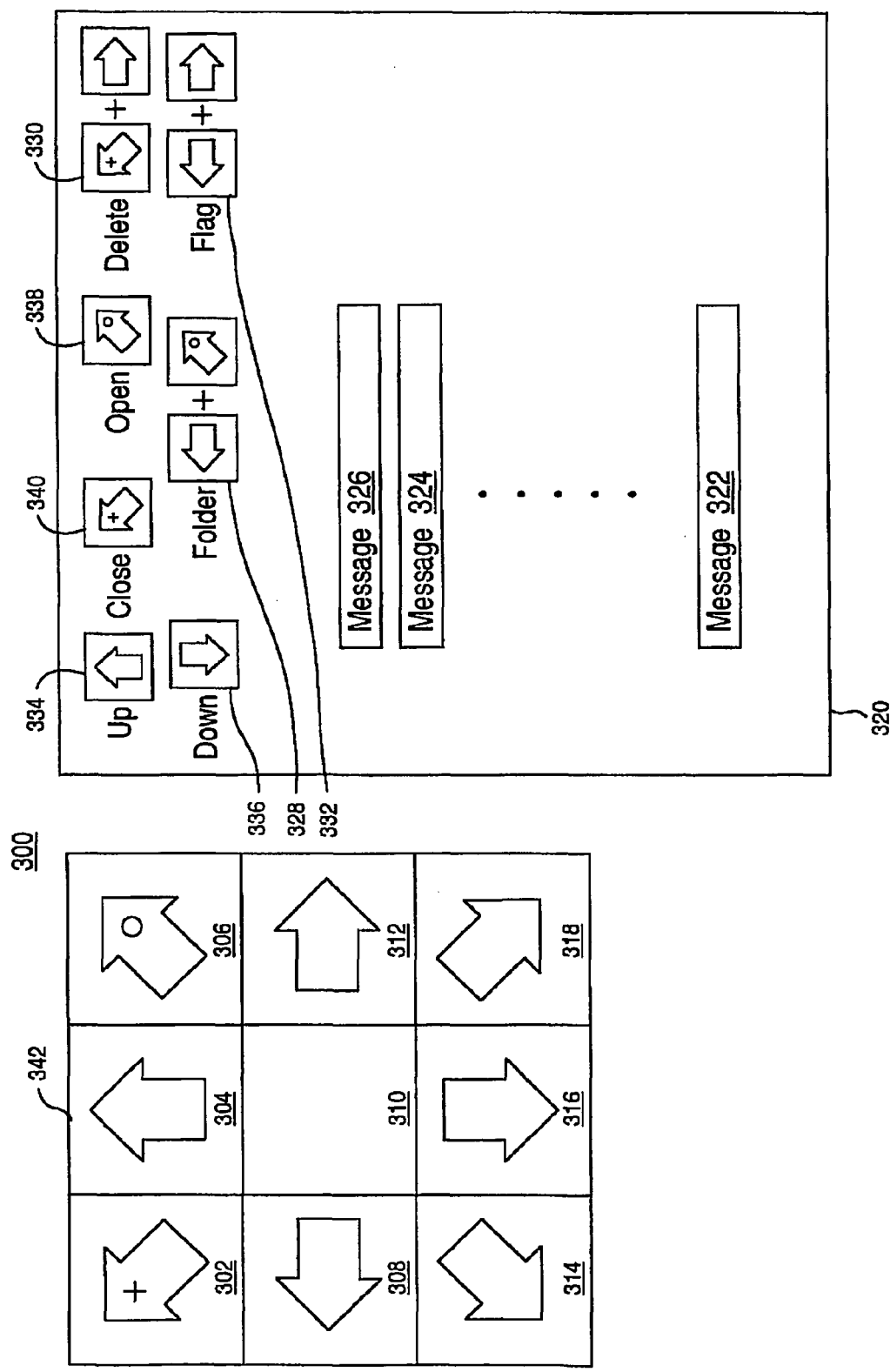
FIG. 3 illustrates block diagrams of a system for checking email via a foot-based interface, in accordance with an embodiment of the present invention.

FIG. 3 illustrates block diagrams of a system 300 for checking email via a foot-based interface, in accordance with an embodiment of the present invention. System 300 includes a foot pad 342 for receiving user input, which is further divided into step-on-section 302, step-on-section 304, step-on-section 306, step-on-section 308, step-on-section 310, step-on-section 312, step-on-section 314, step-on-section 316, and step-on-section 318. In one embodiment, each of the step-on-sections corresponds to selection of a different email application program function and a user can open email messages, delete email messages, flag email messages, and navigate through the list of email messages by stepping on one or a combination or step-on-sections.

In addition to foot pad 342, system 300 includes a display 320 showing a list of email messages and various application program functions. Specifically, display 320 includes up function 334 for scrolling upward (e.g., scrolling up within an email message or scrolling up the list of email messages), down function 336 for scrolling downward (e.g., scrolling down within an email message or scrolling down the list of email messages), open function 338 for opening an email message, close function 340 for closing an email message, folder function 328 for placing an email message into a folder, delete function 330 for deleting an email message, and flag function 332 for flagging an email message. Also included in display 320 are messages 326, 324, and 322.

Moreover, although system 300 is shown and described as having certain numbers and types of elements, the present invention is not so limited; that is, system 300 may include elements other than those shown, and may include more than one of the elements that are shown. For example, system 300 can include a greater or fewer number of step-on-sections than the nine (302, 304, 306, 308, 310, 312, 314, 316, and 318) shown. In another example, display 320 can include greater or fewer number of email application program functions than the seven (up 334, down 336, open 338, close 340, folder 328, delete 330, and flag 332) shown.

In one embodiment, food pad 342 is configured to receive user input for the email application program. A user generates input by applying physical contact, e.g., stepping on, on one or more of the step-on-sections. It is understood that physical contact can be applied in a variety of ways. In one instance, physical contact can be generated by a momentary application of force to a step-on-section. For example, a user can step on a step-on-section and quickly lift off his or her foot. In another instance, physical contact can be a continual application of force to a step-on-section. For example, a user can step on a step-on-section and hold the position by leaving his or her foot grounded. In yet another instance, physical contact can be an approximately simultaneous application of force to two or more step-on-sections. For example, a user can step on two or more step-on-sections approximately simultaneously.

A momentary application of force, a continual application of force, and an approximately simultaneous application of force to two or more step-on-sections can each correspond to an email application program function. In one embodiment, a continual application of force on step-on-section 304 can correspond to selection of up function 334. In another embodiment, a momentary application of force on step-on-section 306 can correspond to selection of open function 338. In still another embodiment, an approximately simultaneous application of force to two or more step-on-sections 302 and 312 can correspond to selection of delete function 330.

In one embodiment, a user can get up from his or her normal work position and check his or her email by utilizing the foot-pad based email interface. A user can scroll up and down a list of email messages by stepping on step-on-sections that correspond to up function 334 and down function 336 respectively. Further, a user can also open or close email messages by stepping on step-on-sections that correspond to open function 338 and close function 340 respectively. In addition, a user can also flag or delete email messages by stepping on step-on-sections that correspond to flag function 332 and delete function 330 respectively.

Thus, embodiments allow users to efficiently perform email application functions with a foot-based interface, such as footpad 342. Advantageously, embodiments allow a user to engage in physical activity while performing productive functions. Also, the interactive break helps users stay fit and aids in preventing Repetitive Stress Injury (RSI).

Figure 4:
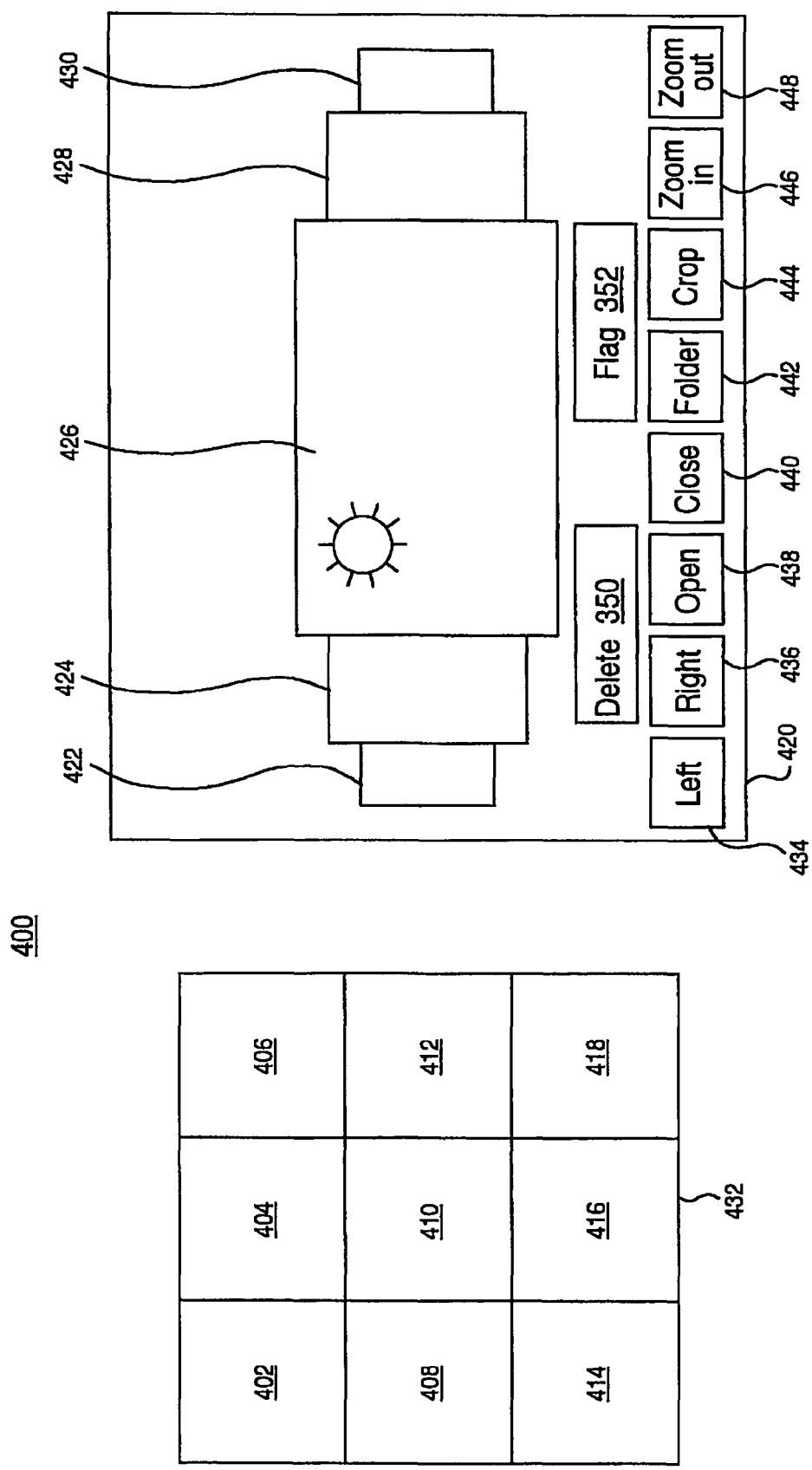
FIG. 4 illustrates block diagram of a system for photo management via a foot-based interface, in accordance with an embodiment of the present invention.

FIG. 4 illustrates block diagram of a system 400 for photo management via a foot-based interface, in accordance with an embodiment of the present invention. System 400 includes a foot pad 432 for receiving user input, which is further divided into step-on-section 402, step-on-section 404, step-on-section 406, step-on-section 408, step-on-section 410, step-on-section 412, step-on-section 414, step-on-section 416, and step-on-section 418. In one embodiment, each of the step-on-sections corresponds to selection of a different photo management application program function and a user can open photos, close photos, place photos into folders, crop photos, zoom in and zoom out of photos, delete photos, flag photos, and navigate through the list of photos by stepping on one or a combination or step-on-sections.

In addition to foot pad 432, system 400 includes a display 420 showing a list of photos, from photos 422, 424, 426, 428, through 430, and various photos application program functions. Specifically, display 420 includes left function 434 for scrolling leftward, right function 436 for scrolling rightward, open function 438 for opening a photo, close function 440 for closing a photo, folder function 442 for placing a photo into a folder, crop function 444 for cropping a photo, zoom in function 446 for zooming in a photo, zoom out function 448 for zooming out a photo, delete function 450 for deleting a photo, and flag function 452 for flagging a photo.

Moreover, although system 400 is shown and described as having certain numbers and types of elements, the present invention is not so limited; that is, system 400 may include elements other than those shown, and may include more than one of the elements that are shown. For example, system 400 can include a greater or fewer number of step-on-sections than the nine (402, 404, 406, 408, 410, 412, 414, 416, and 418) shown. In another example, display 420 can include greater or fewer number of photo management application program functions than the ten (left function 434, right function 436, open function 438, close function 440, folder function 442, crop function 444, zoom in function 446, zoom out function 448, delete function 450, and flag function 452) shown.

In one embodiment, food pad 432 is configured to receive user input for the photos application program. A user generates input by applying physical contact, e.g., stepping on, on one or more of the step-on-sections. It is understood that physical contact can be applied in a variety of ways. In one instance, physical contact can be generated by a momentary application of force to a step-on-section. For example, a user can step on a step-on-section and quickly lift off his or her foot. In another instance, physical contact can be a continual application of force to a step-on-section. For example, a user can step on a step-on-section and hold the position by leaving his or her foot grounded. In yet another instance, physical contact can be an approximately simultaneous application of force to two or more step-on-sections. For example, a user can step on two or more step-on-sections approximately simultaneously.

A momentary application of force, a continual application of force, and an approximately simultaneous application of force to two or more step-on-sections can each correspond to a photos application program function. In one embodiment, a continual application of force on step-on-section 406 can correspond to selection of right function 436. In another embodiment, a momentary application of force on step-on-section 404 can correspond to selection of open function 438. In still another embodiment, an approximately simultaneous application of force to two or more step-on-sections 410 and 418 can correspond to selection of delete function 450.

In one embodiment, a user can get up from his or her normal work position and perform his or her photos management by utilizing the foot-pad based photos management interface. A user can, for example, navigate through a list of photos by stepping on step-on-sections that correspond to right function 436 and left function 434 respectively. Further, a user can also open or close photos by stepping on step-on-sections that correspond to open function 438 and close function 440 respectively. In addition, a user can also flag or delete photo by stepping on step-on-sections that correspond to flag function 452 and delete function 450 respectively.

Hence, embodiments enable a user to effectively perform photos management with a foot-based interface. Because the foot-based interface provides a medium for physical activity, a user is able to exercise while performing a fun and interactive activity.

Figure 5:
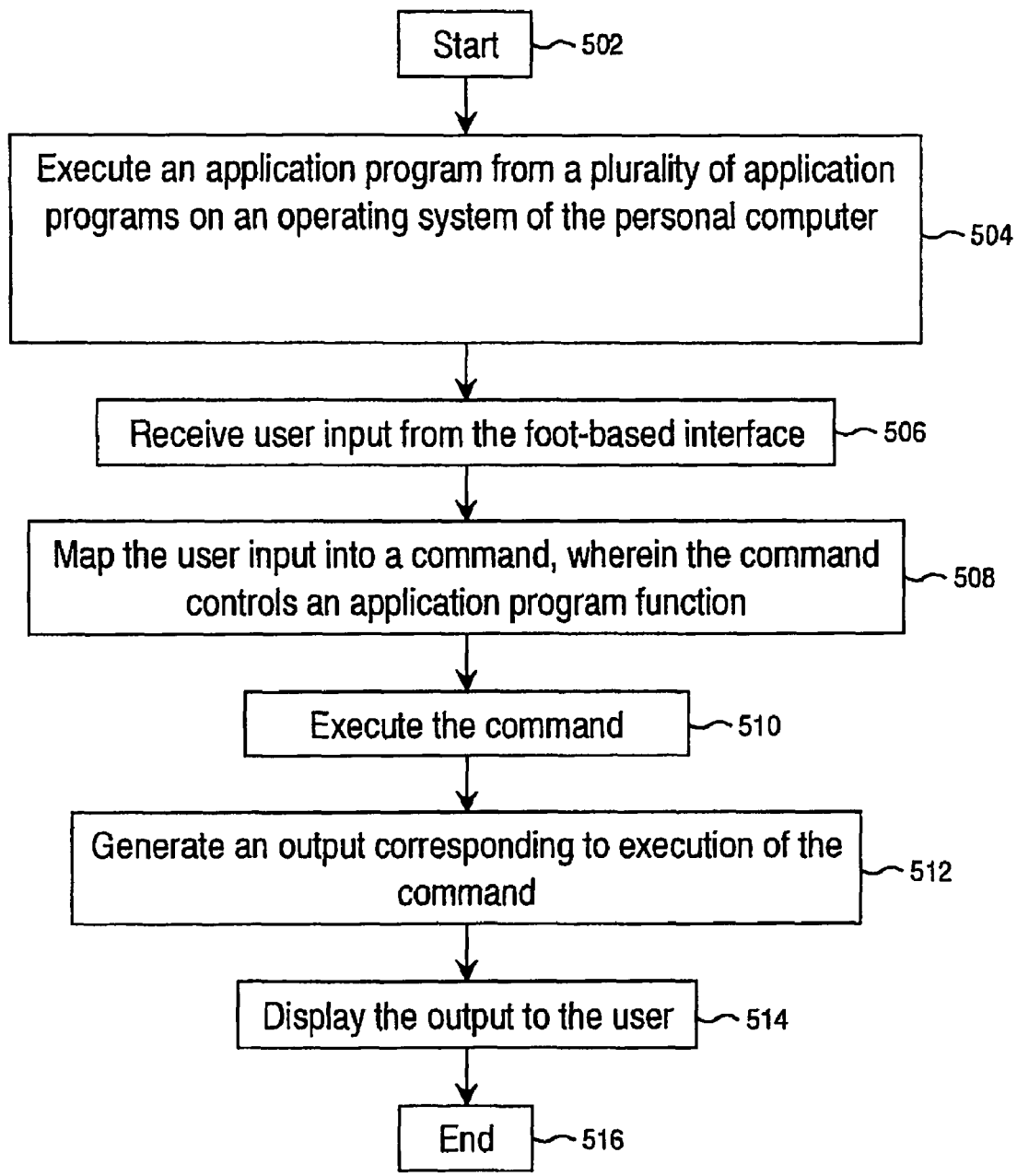
FIG. 5 illustrates a flowchart of a method for using a foot-based interface to interact with a personal computer upon which embodiments in accordance with the present invention can be implemented.

FIG. 5 illustrates a flowchart 500 of a method for using a foot-based interface to interact with a personal computer upon which embodiments in accordance with the present invention can be implemented. Although specific steps are disclosed in flowchart 500, such steps are exemplary. That is, embodiments are well suited to performing various other or additional steps or variations of the steps recited in flowchart 500. It is appreciated that the steps in flowchart 500 can be performed in an order different than presented.

At block 502, the process starts.

At block 504, an application program from a plurality of application programs is executed on an operating system of the personal computer, wherein the application program is configured to receive user input via a foot-based interface. A foot-based interface can be implemented in a variety of ways. For example, a foot-based interface can be a foot pad having a plurality of step-on-sections, wherein the plurality of step-on-sections corresponds to different application program functions. Also, the application program can be an email application program, a photos application program, a text editing application program, and/or a computer operating application program.

In one example, a user can step on a step-on-section corresponding to an open function to open and read an email message. Once the user is finished reading, he or she can step on a step-on-section corresponding to a close function to close the email message. Next, the user can scroll through the list of email messages by stepping on step-on-sections corresponding to scroll-up function and scroll-down functions. Thus, by utilizing the plurality of step-on-sections that correspond to different application program functions, a user can use application programs, such as email, efficiently while being more active.

At block 506, user input is received from the foot-based interface. A user input can be implemented in different ways, for example, a user can generate input by applying physical contact, e.g., stepping on, on one or more of the step-on-sections. It is understood that physical contact can be applied in a variety of ways. In one instance, physical contact can be generated by a momentary application of force to a step-on-section. For example, a user can step on a step-on-section and quickly lift off his or her foot. In another instance, physical contact can be a continual application of force to a step-on-section (e.g., an up arrow for scrolling up). For example, a user can step on a step-on-section (e.g., an open symbol for opening a folder and/or an email message) and hold the position by leaving his or her foot grounded. In yet another instance, physical contact can be an approximately simultaneous application of force to two or more step-on-sections. For example, a user can step on two or more step-on-sections approximately simultaneously. Moreover, in one example, the foot-based interface is capable of receiving chorded user input. In one embodiment, a chorded command (e.g. stepping on "left arrow" and "open", holding "left arrow" down, and then scrolling with "up" and "down") is utilized to perform a foldering function.

At block 508, user input is mapped into a command, wherein the command controls an application program function. Mapping can be implemented in different ways. In one example, the mapping of user input into a command is performed by the foot-based interface. In another example, the mapping of user input into a command is performed by a personal computer (PC).

At block 510, the command is executed. In one embodiment, the execution of the command is performed by a personal computer (PC). In another embodiment, the execution of the command is performed by a compatible computing device.

At block 512, an output corresponding to execution of the command is generated. The output, in one embodiment, is generated by a personal computer (PC). In other embodiments, output can be generated by other compatible devices capable of processing the input received.

At block 514, the output is displayed to the user. The output can be displayed to the user on a computer monitor, such as a Cathode Ray Tube (CRT) display or a Light Emitting Diode (LED) screen. Also, the output can be displayed by a projector.

At block 516, the process ends.

Figure 6:
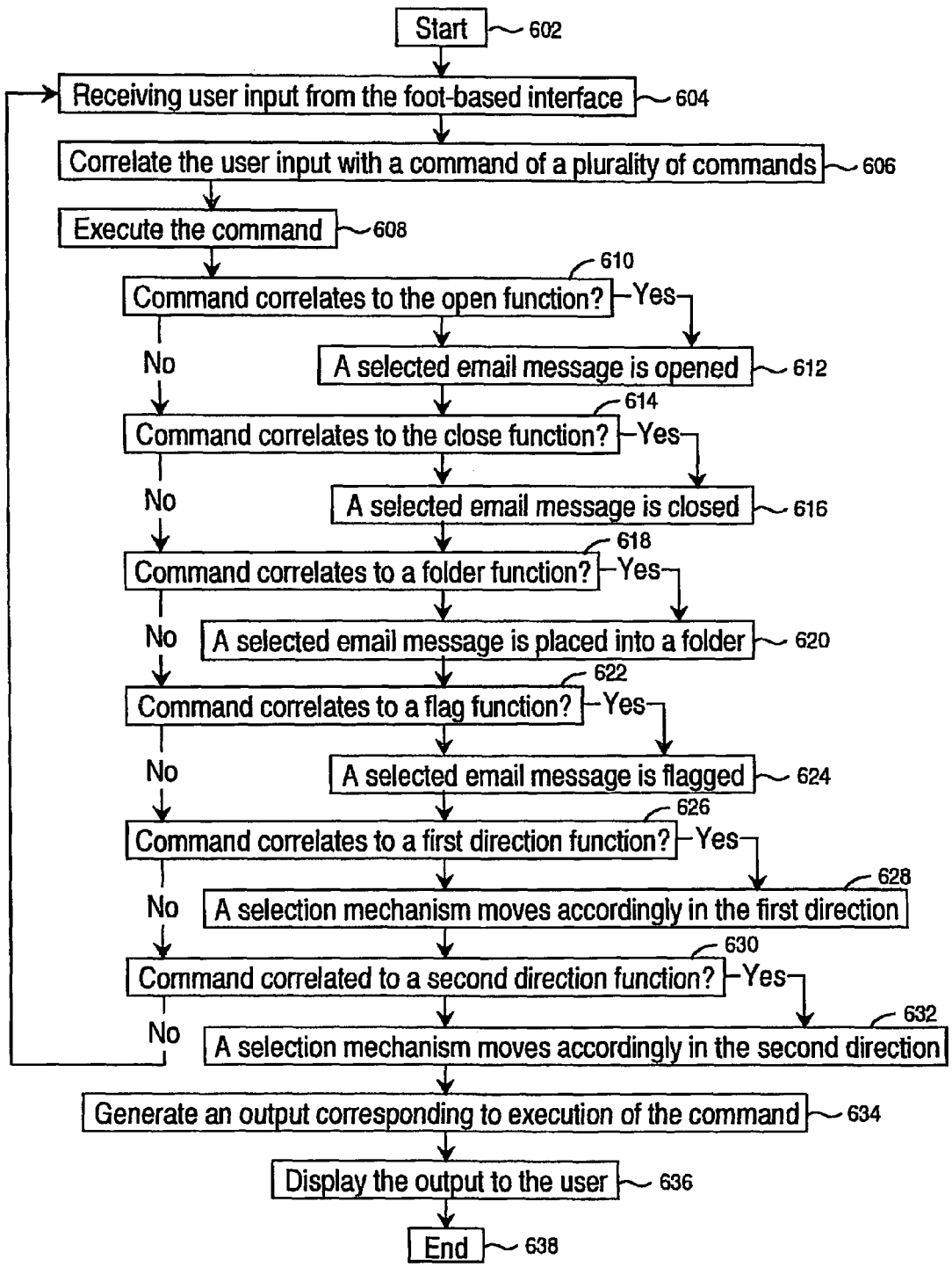
FIG. 6 illustrates a flowchart of a method for using a foot-based interface to interact with an email application upon which embodiments in accordance with the present invention can be implemented.

FIG. 6 illustrates a flowchart 600 of a method for using a foot-based interface to interact with an email application upon which embodiments in accordance with the present invention can be implemented. Although specific steps are disclosed in flowchart 600, such steps are exemplary. That is, embodiments of the present invention are well suited to performing various other or additional steps or variations of the steps recited in flowchart 600. It is appreciated that the steps in flowchart 600 can be performed in an order different than presented.

At block 602, the process starts.

At block 604, user input from the foot-based interface is received. In one embodiment, the foot-based interface is a foot pad having a plurality of step-on sections, and wherein physical contact by the user with the foot pad generates the user input. In another embodiment, the foot-based interface includes a mechanical sensor disposed to receive foot-based input from a user.

At block 606, the user input is correlated with a command of a plurality of commands, wherein the commands control the email application, wherein the email application has a plurality of email application functions, and wherein the email application functions include an open function, a delete function, a folder function, a flag function, a first direction function, and a second direction function. In one embodiment, continual physical contact with a step-on-section directs a command to be automatically repeated. In another embodiment, approximately simultaneous physical contact with at least two step-on-sections executes the delete function.

At block 608, the command is executed. In one embodiment, the execution of the command is performed by a personal computer (PC). In another embodiment, the execution of the command is performed by a compatible computing device.

At block 610, it is determined whether the command correlates to the open function. If the command correlates to the open function, then a selected email message is opened as indicated in block 612. In one embodiment, the open function can open one or more email messages.

At block 614, it is determined whether the command correlates to the close function. If the command correlates to the close function, then a selected email message is closed as indicated in block 616. In one embodiment, the close function can close one or more email messages.

At block 618, it is determined whether the command correlates to a folder function. If the command correlates to the folder function, then a selected email message is placed into a user specified folder as indicated in block 620. A selected email message can be placed into one or more user specified folder(s).

At block 622, it is determined whether the command correlates to a flag function. If the command correlates to the flag function, then a selected email message is flagged as indicated in block 624. Flagging can be implemented by highlighting, bolding, underlining, coloring, or other techniques that assist the user in distinguishing the flagged email message from other email messages.

At block 626, it is determined whether the command correlates to a first direction function. If the command correlates to the first direction function, then a selection mechanism moves accordingly in the first direction as indicated in block 628. A first direction function can be implemented in a variety of ways. A first direction function can mean moving a selection mechanism, such as a cursor, up, down, left, or right.

At block 630, it is determined whether the command correlates to a second direction function. If the command correlates to the second direction function, then a selection mechanism moves accordingly in the second direction as indicated in block 632. A second direction function can be implemented in a variety of ways. A second direction function can mean moving a selection mechanism, such as a cursor, up, down, left, or right.

At block 634, an output corresponding to execution of the command is generated. The output, in one embodiment, is generated by a personal computer (PC). In other embodiments, output can be generated by other compatible devices capable of processing the input received.

At block 636, the output is displayed to the user. The output can be displayed to the user on a computer monitor, such as a Cathode Ray Tube (CRT) display or a Light Emitting Diode (LED) screen. Also, the output can be displayed by a projector.

At block 638, the process ends.

Figure 7:
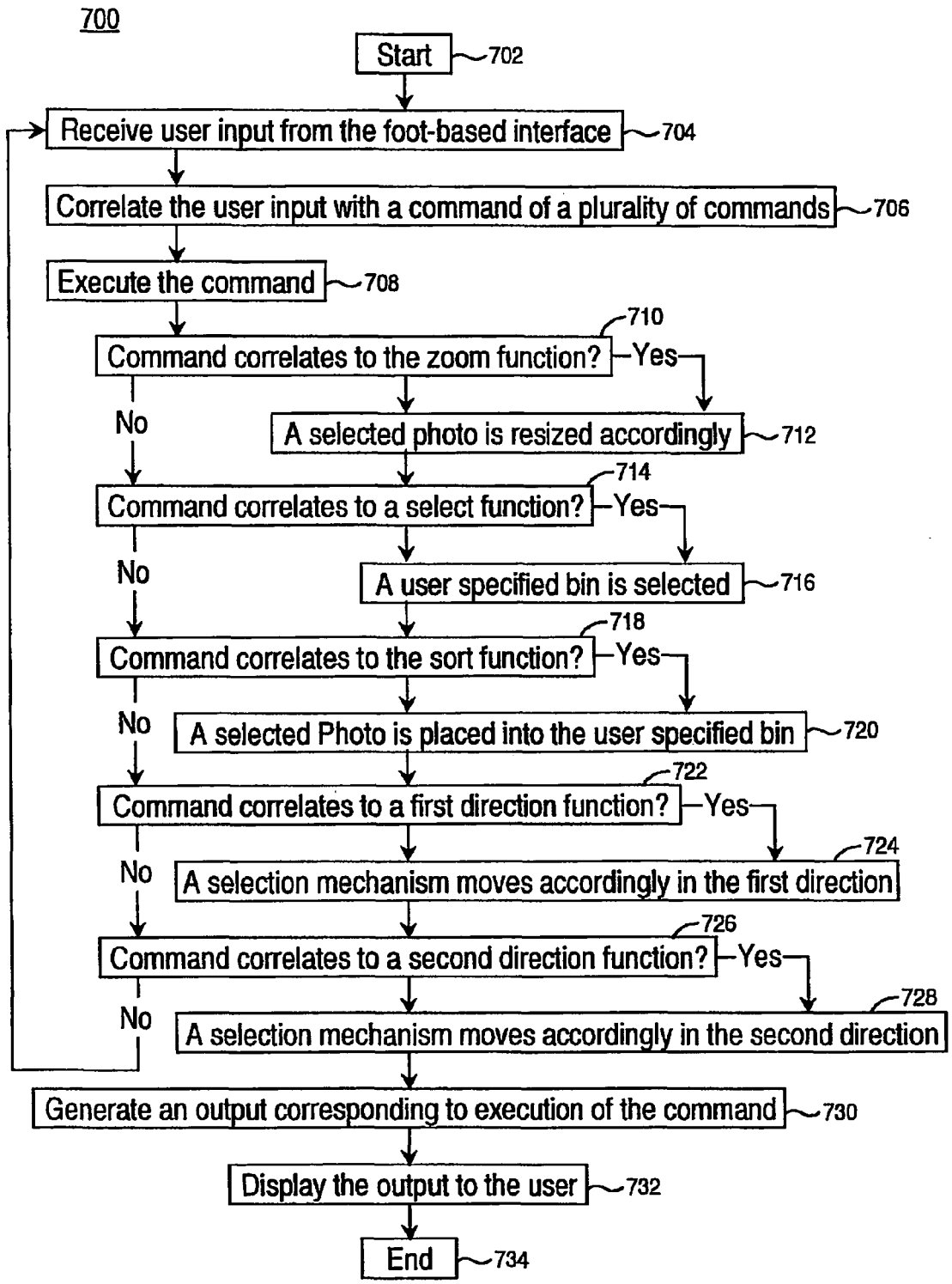
FIG. 7 illustrates a flowchart of a method for using a foot-based interface to interact with a photos application upon which embodiments in accordance with the present invention can be implemented.

FIG. 7 illustrates a flowchart 700 of a method for using a foot-based interface to interact with a photos application upon which embodiments in accordance with the present invention can be implemented. Although specific steps are disclosed in flowchart 700, such steps are exemplary. That is, embodiments of the present invention are well suited to performing various other or additional steps or variations of the steps recited in flowchart 700. It is appreciated that the steps in flowchart 700 can be performed in an order different than presented.

At block 702, the process starts.

At block 704, user input from the foot-based interface is received. In one embodiment, the foot-based interface is a foot pad having a plurality of step-on sections, and wherein physical contact by the user with the foot pad generates the user input. In another embodiment, the foot-based interface includes a mechanical sensor disposed to receive foot-based input from a user.

At block 706, the user input is correlated with a command of a plurality of commands, wherein the commands control the photos application, wherein the photos application has a plurality of photos application functions, and wherein the photos application functions include a zoom function, a select function, a sort function, a first direction function, and a second direction function. In one embodiment, continual physical contact with a step-on-section directs a command to be automatically repeated. In another embodiment, approximately. simultaneous physical contact with at least two step-on-sections executes the delete function.

At block 708, the command is executed. In one embodiment, the execution of the command is performed by a personal computer (PC). In another embodiment, the execution of the command is performed by a compatible computing device.

At block 710, it is determined whether the command correlates to the zoom function. If the command correlates to the zoom function, then a selected photo is resized accordingly as indicated in block 712. The zoom function can zoom in or zoom out of a selected photo.

At block 714, it is determined whether the command correlates to the select function. If the command correlates to the select function, then a user specified bin is selected as indicated in block 716. It is understood there can be any number of bins available for user selection. Also, additional bins can be created.

At block 718, it is determined whether the command correlates to a sort function. If the command correlates to the sort function, then a selected photo is placed into a user specified bin as indicated in block 720. In response to a user input, selected photo can be placed into one or more user specified bin(s).

At block 722, it is determined whether the command correlates to a first direction function. If the command correlates to the first direction function, then a selection mechanism moves accordingly in the first direction as indicated in block 724. A first direction function can be implemented in a variety of ways. A first direction function can be directed towards moving a selection mechanism, such as a cursor, up, down, left, or right.

At block 726, it is determined whether the command correlates to a second direction function. If the command correlates to the second direction function, then a selection mechanism moves accordingly in the second direction as indicated in block 728. A second direction function can be implemented in a variety of ways. A second direction function can be directed towards moving a selection mechanism, such as a cursor, up, down, left, or right.

At block 730, an output corresponding to execution of the command is generated. The output, in one embodiment, is generated by a personal computer (PC). In other embodiments, output can be generated by other compatible devices capable of processing the input received.

At block 732, the output is displayed to the user. The output can be displayed to the user on a computer monitor, such as a Cathode Ray Tube (CRT) display or a Light Emitting Diode (LED) screen. Also, the output can be displayed by a projector.

At block 734, the process ends.

Figure 8:
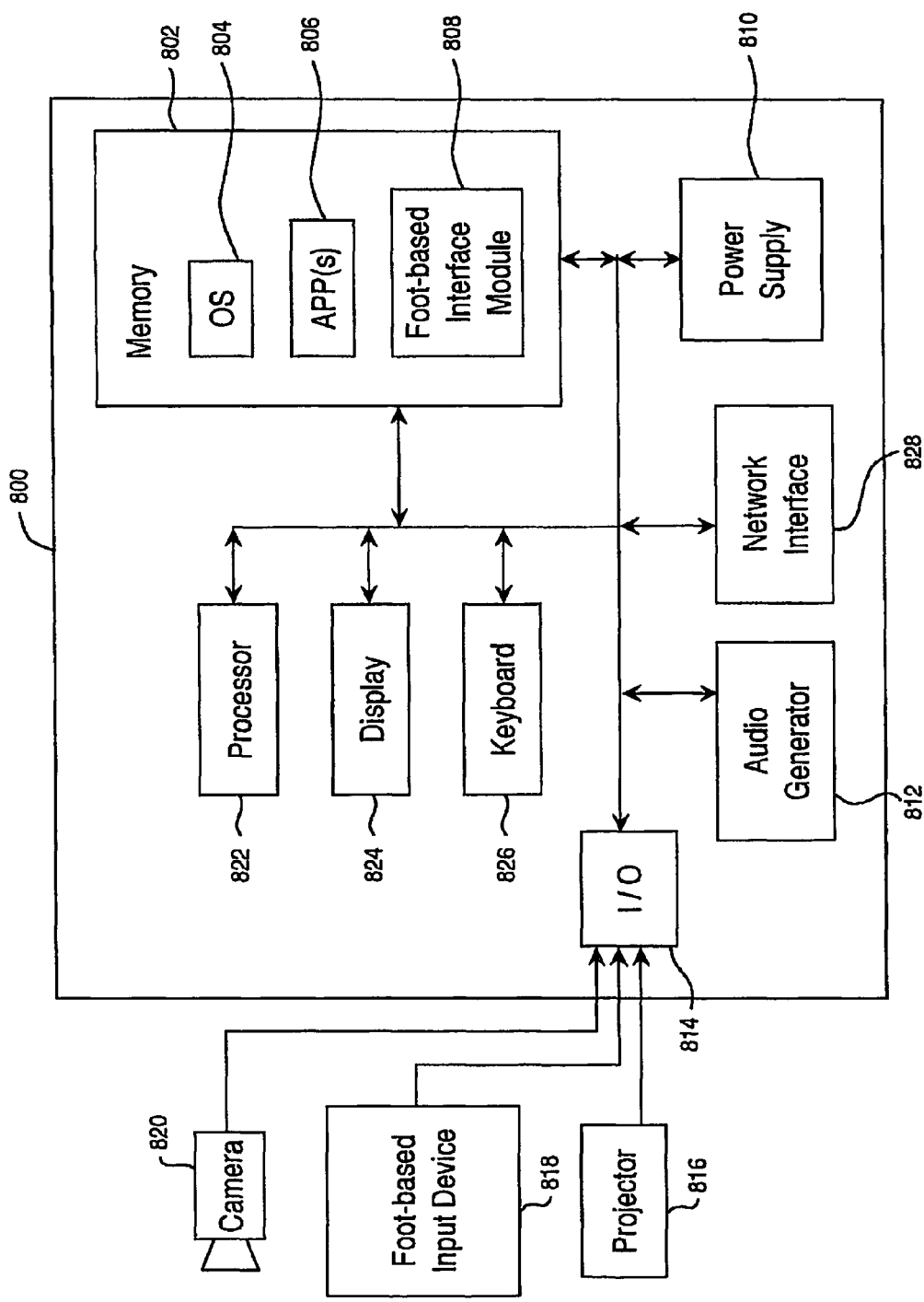
FIG. 8 shows functional components of a personal computing device upon which embodiments in accordance with the present invention can be implemented.

FIG. 8 shows functional components of a personal computing device 800. It has a processor 822, a memory 802, a display 824, an input/output device 814, a keyboard 826, and a network interface 828. The memory 802 generally includes both volatile memory (e.g., RAM) and non-volatile memory (e.g., ROM, PCMCIA cards, etc.). An operating system 804 is resident in the memory 802 and executes on the processor 822. The personal computer 800 includes an operating system, such as the Windows® XP operating system from Microsoft Corporation or other operating system.

One or more application programs 806 are loaded into memory 802 and run on the operating system 804. Examples of applications include email programs, photos management programs, word processing programs, spreadsheet programs, Internet browser programs, and so forth. The personal computer 800 also has a foot-based interface module 808 loaded in memory 802, which executes on the processor 822. The foot-based interface module 808 handles foot-based input received.

The personal computer 800 has a power supply 810. The power supply 810 may include an external power source, such as an AC adaptor or a powered docking station.

The personal computer 800 is shown with three types of external notification mechanisms: a display 824, an audio generator 812, and projector 816. In one embodiment, these devices are directly coupled to the power supply 810 so that when activated, they remain on for a duration dictated by the foot-based interface module even though the personal computer processor and other components might shut down to conserve power.

The personal computer 800 is shown with two types of foot-based interface input device: camera 820 and foot-based input device 818 (e.g., a foot pad). In one embodiment, camera 820 detects user input (e.g., user movement) and forwards it to input/output device 814. In another embodiment, foot-based input device, such as a foot pad, receives user input (e.g., stepping action) and forwards it to input/output device 814. Also, it is understood that input/output device 814 is capable of coupling with and providing output to a printer.

The personal computer 800 has a network interface 828. Network interface may provide a two-way data communication to a network link that is connected to a Local Area Network (LAN) or Wide Area Network (WAN). Network interface 828 may be an integrated services digital network (OSDN) card or a modem to provide a data communication connection to a corresponding type of telephone line. As another example, network interface 828 may be a local area network (LAN) card to provide a data communication connection to a compatible LAN. Wireless links may also be implemented. In any such implementation, network interface 828 sends and receives electrical, electromagnetic or optical signals that carry digital data streams representing various types of information.

To summarize, embodiments allow a user to take a break from his or her normal working position and engage in a fun and interactive way of interacting with a personal computer.

In contrast to the traditional method of using a keyboard and mouse to interact with a computer, embodiments efficiently utilize a foot-based interface, such as a foot pad, to interact with different application programs (e.g., email or photos application programs). In one example, a user can easily check email by stepping on different sections of a foot pad.

By encouraging a user to exercise, an increase in cardiovascular health, improvement in muscle tone, increase in bone density, reduction in anxiety and stress may be achieved.

In addition to the health benefits, embodiments also serve as a more efficient interface for certain situations. For example, a mother with a baby in her arms may easily perform simple tasks, such as checking email, by utilizing the foot-based interface of interacting with a personal computer. In another instance, interactive advertisement from businesses can utilize embodiments as an effective interface that enables easy interaction with shoppers that carry bags in their hands.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of using a foot-based interface device to interact with a personal computer, said method comprising:

executing a first application program and a second application program on said personal computer, the first application program comprising a first plurality of functions and a first plurality of user interface elements, the first functions invocable by user interaction with the first user interface elements, respectively, the second application program comprising a second plurality of functions and a second plurality of user interface elements, the second functions invocable by user interaction with the second user interface elements, respectively;

receiving from said foot-based interface device user inputs directed to the first application program and user inputs directed to the second application program, said foot-based interface device comprising an electromagnetic wave sensor and a projecting device projecting an image comprising a plurality of sections that are activated by the electromagnetic wave sensor sensing physical movement of the user's feet within the image and generating, the user inputs, which correspond to the sections;

mapping said user inputs to the program functions of the first and second application program, by:

for the user inputs directed to the first application program, activating a first of the first program functions whenever the foot-based interface device determines that one of the user's feet has activated a corresponding particular single section, activating a second of the first program functions whenever the foot-based interface device determines that the user's feet have activated a corresponding pair of sections concurrently, and continuously activating a third of the first program functions as long as the foot-based interface device determines that one of the user's feet is activating a particular section, and for the user inputs directed to the second application program, activating a first of the second program functions whenever the foot-based interface device determines that one of the user's feet has activated a corresponding particular single section, activating a second of the second program functions whenever the foot-based interface device determines that the user's feet have activated a corresponding pair of sections concurrently, and continuously activating a third of the second program functions as long as the foot-based interface device determines that one of the user's feet is activating a particular section;

generating outputs corresponding to activations of the program functions; and displaying said outputs to said user, wherein the mapping is performed by a module available to any application executing on the personal computer.

2. The method of claim 1, wherein each section comprises a different area of the projected image.

3. The method of claim 1, wherein approximately simultaneous activation of at least two sections comprises a user input that maps to a command that is not associated with a single section.

4. The method of claim 1, wherein said first application program comprises an email application program.

5. The method of claim 1, wherein said second application program comprises a photos application program.

6. The method of claim 1, wherein said foot-based interface device is capable of receiving chorded user input.

7. A method of using a foot-based interface to interact with an application program, said method comprising:

receiving user inputs from said foot-based interface, said foot-based interface comprising a projected image having sections activated when an electromagnetic wave sensor detects movement or presence of a user's foot in a section, the user inputs having been generated by the electromagnetic wave sensor sensing foot movement or presence within the sections;

correlating said user inputs with a plurality of commands of an application program, wherein said commands control said application program, wherein said application program has a plurality of application functions, and wherein said application functions include a zoom function, a select function, a first direction function, and a second direction function, wherein the correlating comprises correlating activation of one section with one of the application functions, correlating simultaneous activation of two other of the sections with another one of the application functions, and correlating continued activation of yet another of the sections with continued activation of yet another of the application functions;

executing a correlated application command, wherein:
when said correlated application command correlates to said zoom function, then a displayed graphic is resized accordingly by the application program;
when said application command correlates to a select function, then a user specified item is selected by the application program;
when said application command correlates to a first direction function, then a selection mechanism of the application program moves accordingly in the first direction;
when said application command correlates to a second direction function, then a selection mechanism of the application program moves accordingly in the second direction;
generating an output corresponding to execution of said application command; and
displaying said output to said user.

8. A computer-implemented method for using a foot-based interface device, the foot-based interface device comprising a projected image comprised of sections each individually activatable according to sensing of movement and/or presence of a user's foot according to an electromagnetic wave sensor, the method comprising:

associating, in advance, different inputs from the foot-based interface device with different functions of arbitrary application programs;

when a first application program is active, repeatedly receiving signals from the foot-based interface device indicating which sections are being activated by a foot and responding such that when a first section is activated a first function of the first application program is identified as corresponding to the first section and is therefore executed, when a second and third section are concurrently activated a second function of the first application program is identified as corresponding to the concurrent activation of the second and third sections and is therefore executed, and while a fourth section remains activated by a foot a third function of the first application program is identified as corresponding to such activation and is therefore executed while such activation continues; and when a second application program is active, repeatedly receiving signals from the foot-based interface device indicating which sections are being activated by a foot and responding such that when a particular section is activated a first function of the second application program is identified as corresponding to the particular section and is therefore executed, when two particular sections are concurrently activated a second function of the second application program is identified as corresponding to the concurrent activation of the two particular sections and is therefore executed, and while another particular section remains activated by a foot a third function of the first application program is identified as corresponding to such activation and is therefore executed while such activation continues.

9. A method according to claim 8, wherein the fourth section comprises the first section.

10. A method according to claim 8, wherein the second section comprises either the first section or the fourth section.

* * * * *

UNITED STATES PATENT AND TRADEMARK OFFICE
CERTIFICATE OF CORRECTION

| | | |
|---|---|---|
| PATENT NO. | : 7,830,359 B2 | Page 1 of 1 |
| APPLICATION NO. | : 11/350189 | |
| DATED | : November 9, 2010 | |
| INVENTOR(S) | : Brush et al. | |

It is certified that error appears in the above-identified patent and that said Letters Patent is hereby corrected as shown below:

In column 12, line 50, in Claim 1, delete "generating," and insert -- generating --, therefor.

Signed and Sealed this
Third Day of May, 2011

David J. Kappos
*Director of the United States Patent and Trademark Office*